(No Model.) 2 Sheets—Sheet 1.
C. E. BENTON.
TRANSPORTATION CHEST OR TRUNK FOR BICYCLES, &c.
No. 588,050. Patented Aug. 10, 1897.
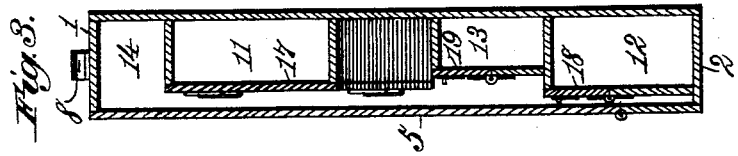
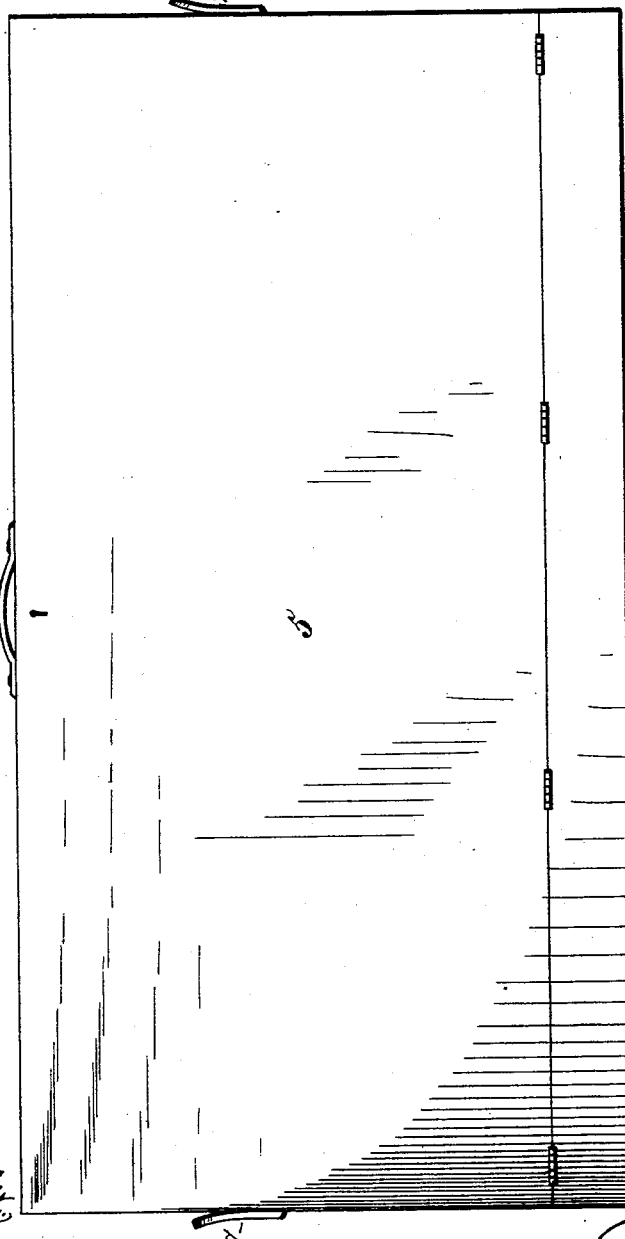
Witnesses,
Inventor,
Charles E. Benton.
By James L. Norris.
Atty.
THE NORRIS PETERS CO., PHOTO-LITHO., WASHINGTON, D. C.

(No Model.) 2 Sheets—Sheet 2.
C. E. BENTON.
TRANSPORTATION CHEST OR TRUNK FOR BICYCLES, &c.
No. 588,050. Patented Aug. 10, 1897.
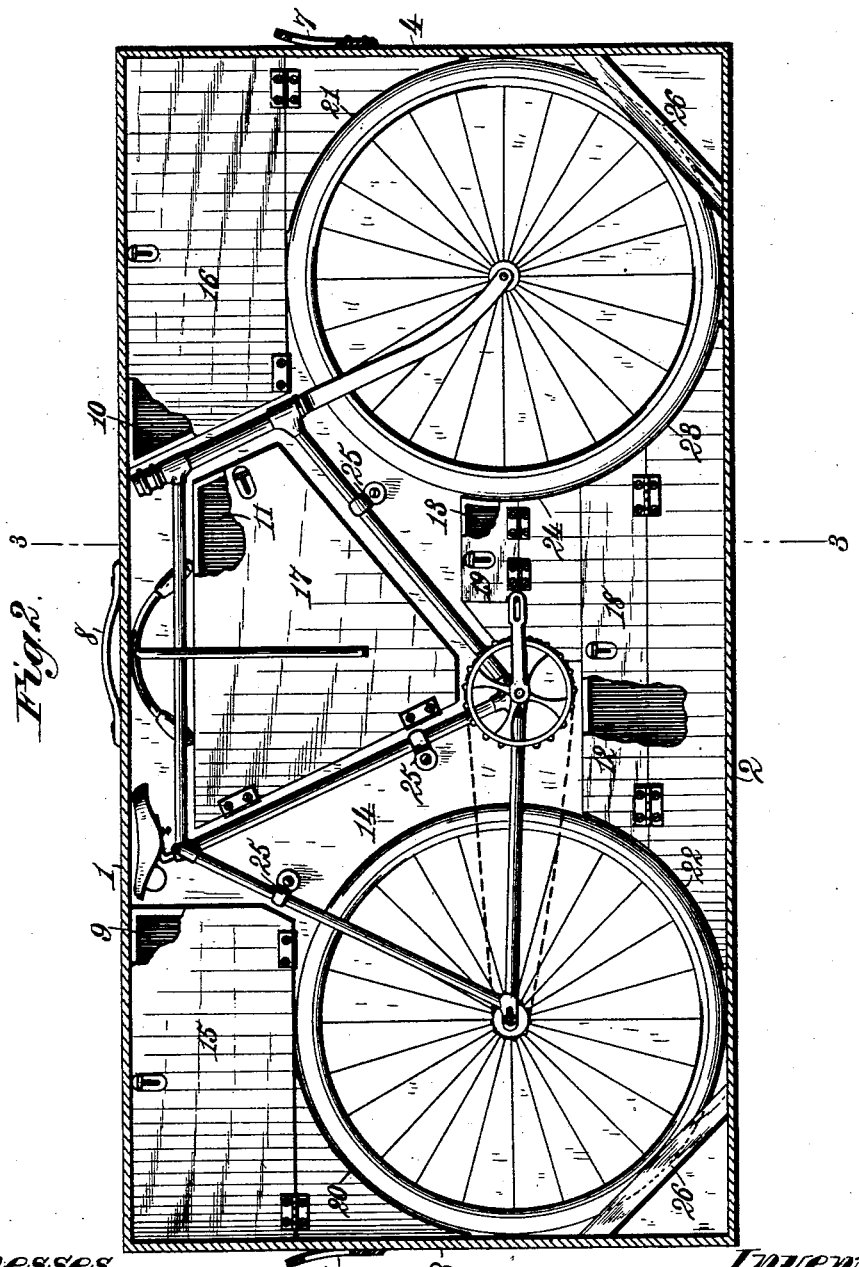
Witnesses:
Inventor:
Charles E. Benton.
By James L. Norris.
Atty.

UNITED STATES PATENT OFFICE.

CHARLES E. BENTON, OF NEW BEDFORD, MASSACHUSETTS.

TRANSPORTATION CHEST OR TRUNK FOR BICYCLES, &c.

SPECIFICATION forming part of Letters Patent No. 588,050, dated August 10, 1897.

Application filed April 14, 1897. Serial No. 632,131. (No model.)

*To all whom it may concern:*

Be it known that I, CHARLES E. BENTON, a citizen of the United States, residing at New Bedford, in the county of Bristol and State of Massachusetts, have invented new and useful Improvements in Transportation Chests or Trunks for Bicycles, &c., of which the following is a specification.

This invention relates to portable traveling chests or trunks for carrying various articles; and the chief object of the present invention is to provide a novel, simple, efficient, and economical chest or trunk which is entirely closed, is light in weight, is strong and durable, is susceptible of being conveniently handled, and is designed with particular reference to transporting a bicycle in a safe, cleanly, and convenient manner, as baggage or otherwise, with or without other articles, such as clothing and the like, which may be housed away from the bicycle, the parts being so constructed that the bicycle may be easily removed and replaced and when in position cannot unduly shift about or come in contact with the clothing or other articles packed or stored in the chest or trunk.

The object of my invention is accomplished in the manner and by the means hereinafter described and claimed, reference being made to the accompanying drawings, in which—

Figure 1 is a side elevation of my improved bicycle chest or trunk. Fig. 2 is a plan view omitting the door or one side of the chest or trunk for the purpose of showing the internal construction thereof, a bicycle being housed in position to be transported; and Fig. 3 is a sectional view taken on the line 3 3, Fig. 2, showing the door or side which is omitted therein.

In order to enable those skilled in the art to make and use my invention, I will now describe the same in detail, referring to the drawings, wherein it will be observed that the chest or trunk comprises a rectangular casing made up of edge walls 1 and 2 and end walls 3 and 4, which may be of any material suitable for the purpose in hand and be rigidly connected together through the medium of any type of fastening devices. The chest or trunk is preferably provided with handles 7 and 8 at its edges for the purpose of conveniently carrying the same. The chest or trunk also comprises at one side an opening and closing door 5, suitably hinged to the casing and designed to be provided with a suitable locking device for securing it in its closed position. The door preferably extends the full length and nearly the full width of the casing at one side thereof. I do not, however, wish to be understood as confining myself to the use of a single door at one side of the chest or trunk, as any desired number of doors may be employed, and they may be arranged in any desired manner. The interior of the casing is provided with a plurality of specially-constructed compartments 9, 10, 11, 12, 13, and 14. The compartments 9, 10, 11, 12, and 13 are provided with hinged covers or lids 15, 16, 17, 18, and 19, and are designed to contain special articles, as will hereinafter appear, while the main chamber 14 of the casing is designed to contain a bicycle, after the handle-bar and pedals are removed, as will be clearly understood by reference to Fig. 3.

In Fig. 2 of the drawings I have broken away portions of the covers or lids 15, 16, 17, 18, and 19 for the purpose of indicating the compartments 9, 10, 11, 12, and 13.

The inner edge portions of the compartments 9 and 10 are constructed with concavities 20 and 21 to receive and more or less accurately fit portions of the peripheries of the wheels of the bicycle. The end portions of the compartment 12 are also constructed with concavities 22 and 23, which receive and more or less accurately fit portions of the wheel-peripheries opposite the portions which seat into the concavities 20 and 21 of the compartments 9 and 10. The compartment 13 is also preferably constructed at one end with a concavity 24 to bear against a portion of the periphery of one of the bicycle-wheels, and this concavity 24 constitutes a uniform continuation of the concavity 23 at one end of the compartment 12.

The compartment 11 is substantially trapezi form and is designed to enter the similarly-shaped space of the bicycle-frame when the bicycle is placed in the chest or trunk, by which means the space referred to is utilized for packing or storing clothing or any other desired articles.

The bicycle-frame is held down in position within the case through the medium of buttons 25 of any construction suitable for the purpose.

The compartment 12 utilizes the space between the bicycle-wheels for the storage of clothing or other articles, and the end compartments 9 and 10 can likewise be utilized for packing or storing clothing or other articles likely to be used by a person traveling.

The compartment 13 is designed particularly to receive the pedals and other articles detached from the bicycle, except the handle-bar and post, which latter can be engaged with the bicycle-frame and extend over the cover or lid of the compartment 11, as will be clearly understood by reference to Fig. 3.

The corner portions of the chest or trunk opposite the end compartments are provided with diagonal braces 26, behind which portions of the wheels may be placed, so that the braces hold the wheels steady and also serve to strengthen the framework of the chest or trunk.

The independent or separated compartments constructed and arranged in the manner described and shown render it possible to utilize the entire interior of the chest or trunk for the purpose of transporting a bicycle and clothing or any other articles which a traveler may desire to place in the chest or trunk. The clothing or articles contained in the compartments 9, 10, 11, and 12 are safely housed away from contact with any part of the bicycle, and although the chest or trunk is little larger than the bicycle itself as regards the height and length thereof ample provision is made for packing or storing any desired articles in addition to the bicycle, and practically all the space within the casing is rendered available for transporting any desired articles in addition to the bicycle.

The concaved portions of the compartments 9, 10, 12, and 13 serve to firmly secure the bicycle and prevent it from moving or shifting about, and at the same time the peculiar shape of the compartment or compartments increases their internal capacity for carrying various articles.

I have described and illustrated doors at opposite sides of the casing. I prefer to provide a door at one side for the purpose of introducing and removing the bicycle and a door or doors at the opposite side for introducing and removing the clothing or other articles. I do not, however, limit myself to providing doors at both sides of the casing, and as regards the doors they may be of any construction suitable for the purposes stated.

It will be observed that by my improved construction of parts the bicycle can be removed and replaced without disturbing or without uncovering the compartments containing the clothing or other articles and that it is possible to open any one of the compartments without disturbing the bicycle if it is housed in the chest or trunk.

In practice the chest or trunk will be made approximately six feet in length, three feet four inches in height, and eight inches in depth; but I do not wish to be understood as confining myself to any particular dimensions, as these may be varied to suit the conditions required without altering the spirit of my invention. The construction of the parts should be such that a suitable space is provided between the lid of the compartment 11 and the door 5 of the casing to accommodate the handle-bar and post, and likewise a suitable space should be provided between the lid of the compartment 13 and the door 5 to accommodate the outer crank-arm and sprocket-wheel of the bicycle. Therefore the depth of the compartments 11 and 13 is preferably less than the depth of the compartments 9, 10, and 12, as these may extend the full depth of the casing.

While I have illustrated six chambers or compartments within the chest or trunk, I wish it understood that the number may be increased or diminished to any desired extent.

Having thus described my invention, what I claim is—

1. A transportation chest or trunk for a bicycle, clothing and other articles, consisting of a casing constructed with a series of independent and separated internal compartments designed for clothing and other articles and arranged to bear against opposing parts of the peripheries of the wheels of a bicycle introduced into the chest or trunk, and means for gaining access to the interior of the chest or trunk and the interiors of the said compartments, substantially as described.

2. A transportation chest, or trunk for a bicycle, clothing and other articles, consisting of a casing having a chamber constructed to receive a bicycle and compartments designed for clothing and other articles and arranged in said casing to lie, respectively, at opposite ends of the bicycle-frame, between the wheels of the bicycle and within the frame thereof, all of said compartments having suitable doors by which they may be opened or closed, substantially as described.

3. A transportation chest or trunk for a bicycle, clothing and other articles, provided with independent, internal compartments constructed with concavities to accommodate and bear against portions of the peripheries of the wheels of a bicycle introduced into the casing, one of said compartments having concavities at its opposite ends and lying between the wheels of the bicycle, substantially as described.

In testimony whereof I have hereunto set my hand in presence of two subscribing witnesses.

CHARLES E. BENTON.

Witnesses:
HERBERT C. WILBOR,
CHARLES M. HUSSEY.